United States Patent
Jeon et al.

(10) Patent No.: US 10,810,627 B2
(45) Date of Patent: Oct. 20, 2020

(54) INFORMATIVE ADVERTISEMENTS ON HOBBY AND STRONG INTERESTS FEATURE SPACE

(71) Applicant: Facebook, Inc., Menlo Park, CA (US)

(72) Inventors: Sung-eok Jeon, Bellevue, WA (US); Aliasgar Mumtaz Husain, Milpitas, CA (US)

(73) Assignee: FACEBOOK, INC., Menlo Park, CA (US)

( * ) Notice: Subject to any disclaimer, the term of this patent is extended or adjusted under 35 U.S.C. 154(b) by 127 days.

(21) Appl. No.: 15/233,745

(22) Filed: Aug. 10, 2016

(65) Prior Publication Data

US 2018/0047060 A1 Feb. 15, 2018

(51) Int. Cl.
*G06Q 30/00* (2012.01)
*G06Q 30/02* (2012.01)
*G06N 20/00* (2019.01)

(52) U.S. Cl.
CPC ......... *G06Q 30/0269* (2013.01); *G06N 20/00* (2019.01); *G06Q 30/0251* (2013.01); *G06Q 30/0277* (2013.01)

(58) Field of Classification Search
CPC .......... G06Q 30/0269; G06Q 30/0277; G06N 99/005
See application file for complete search history.

(56) References Cited

U.S. PATENT DOCUMENTS

| | | | | |
|---|---|---|---|---|
| 5,991,735 A * | 11/1999 | Gerace | ............... | G06Q 30/02 705/7.29 |
| 6,591,248 B1 * | 7/2003 | Nakamura | ............ | G06Q 30/02 705/14.52 |
| 7,464,344 B1 * | 12/2008 | Carmichael | ........... | G06Q 30/02 715/854 |
| 8,069,083 B2 * | 11/2011 | Mahdian | ............ | G06Q 30/0239 705/14.7 |
| 8,572,011 B1 * | 10/2013 | Sculley, II | ............ | G06N 20/00 706/13 |
| 8,600,809 B1 * | 12/2013 | Kubica | ................. | G06Q 30/02 705/14.41 |
| 9,712,860 B1 * | 7/2017 | Waggoner | .......... | H04N 21/2662 |
| 2003/0208754 A1 * | 11/2003 | Sridhar | ................ | G06Q 30/02 725/34 |

(Continued)

OTHER PUBLICATIONS

Pustylnick, Igor. "Patterns of Concealed Advertising in Social Network Websites." SMC University, Oct. 2011. (Year: 2011).*

(Continued)

*Primary Examiner* — Luis A Brown (57) ABSTRACT

Information for an advertising campaign is received that includes one or more advertisements for presentation to one or more users of an online system. A strong interest feature domain is generated for each user of the online system. A set of related items is obtained, wherein each item in the set is associated with an action conducted by the one or more users. It can be determined that a viewing user of the online system has interacted with at least one item in the set of related items, and the generated interest feature domain for the viewing user includes an interest feature domain specified in the advertising campaign. Responsive to the determination, an advertisement is selected for presentation to the viewing user.

16 Claims, 3 Drawing Sheets

(56) References Cited

U.S. PATENT DOCUMENTS

| | | | |
|---|---|---|---|
| 2005/0021397 A1* | 1/2005 | Cui | G06Q 30/02 705/14.42 |
| 2005/0080708 A1 | 4/2005 | Zhang et al. | |
| 2005/0240580 A1* | 10/2005 | Zamir | H04L 67/22 |
| 2006/0026060 A1* | 2/2006 | Collins | G06Q 30/02 705/14.41 |
| 2006/0122879 A1* | 6/2006 | O'Kelley | G06Q 30/00 705/14.46 |
| 2006/0149624 A1* | 7/2006 | Baluja | G06Q 30/0255 705/14.53 |
| 2006/0293995 A1* | 12/2006 | Borgs | G06Q 30/02 705/37 |
| 2007/0038508 A1* | 2/2007 | Jain | G06Q 30/02 705/14.41 |
| 2007/0078707 A1* | 4/2007 | Axe | G06Q 30/0273 705/14.41 |
| 2007/0150348 A1* | 6/2007 | Hussain | G06Q 30/0273 705/14.54 |
| 2007/0156514 A1* | 7/2007 | Wright | G06Q 30/02 705/14.41 |
| 2007/0174872 A1* | 7/2007 | Jing | H04N 5/44543 725/46 |
| 2008/0033818 A1* | 2/2008 | Avissar | G06Q 30/02 705/14.39 |
| 2008/0103887 A1* | 5/2008 | Oldham | G06Q 30/02 705/14.71 |
| 2008/0140476 A1* | 6/2008 | Anand | G06Q 30/02 705/14.43 |
| 2008/0140524 A1* | 6/2008 | Anand | G06Q 30/02 705/14.66 |
| 2009/0043648 A1* | 2/2009 | Mahdian | G06Q 30/0242 705/14.39 |
| 2009/0070310 A1 | 3/2009 | Srivastava et al. | |
| 2009/0106103 A1* | 4/2009 | Milana | G06Q 30/02 705/14.41 |
| 2009/0163183 A1* | 6/2009 | O'Donoghue | G06Q 30/02 455/414.1 |
| 2010/0211568 A1* | 8/2010 | Chu | G06F 16/9535 707/732 |
| 2011/0125593 A1 | 5/2011 | Wright et al. | |
| 2011/0196739 A1* | 8/2011 | Zhang | G06Q 30/02 705/14.52 |
| 2011/0313865 A1* | 12/2011 | Sinyagin | G06Q 30/0277 705/14.69 |
| 2012/0221446 A1* | 8/2012 | Grigg | G06Q 30/04 705/30 |
| 2013/0179252 A1* | 7/2013 | Dong | G06F 16/954 705/14.43 |
| 2013/0179258 A1* | 7/2013 | Moskos | G06Q 30/0605 705/14.49 |
| 2014/0143057 A1* | 5/2014 | Lessin | G06Q 50/01 705/14.58 |
| 2014/0208234 A1* | 7/2014 | Amit | G06Q 30/0273 715/753 |
| 2014/0214524 A1* | 7/2014 | Senaratna | G06Q 30/0242 705/14.41 |
| 2014/0358673 A1 | 12/2014 | Sim et al. | |
| 2015/0006242 A1* | 1/2015 | Bhasin | G06Q 30/0201 705/7.29 |
| 2015/0262229 A1* | 9/2015 | Brenner | G06Q 30/0251 705/14.49 |
| 2015/0348136 A1* | 12/2015 | Yang | G06Q 30/0275 705/14.71 |
| 2015/0375104 A1* | 12/2015 | Nishar | A63F 13/12 463/9 |
| 2016/0162913 A1* | 6/2016 | Linden | G06Q 50/01 705/7.31 |
| 2016/0173540 A1 | 6/2016 | Linden et al. | |
| 2016/0225022 A1* | 8/2016 | Kurapati | G06F 16/958 |
| 2016/0343026 A1* | 11/2016 | Cheng | G06Q 30/0244 |
| 2017/0032418 A1* | 2/2017 | Niesen | G06Q 30/0259 |
| 2017/0061013 A1* | 3/2017 | Deng | G06Q 50/01 |
| 2017/0076299 A1* | 3/2017 | Modarresi | G06Q 30/0202 |
| 2017/0083935 A1 | 3/2017 | Maughan et al. | |
| 2017/0127108 A1* | 5/2017 | Kar | H04N 21/2668 |
| 2018/0047060 A1* | 2/2018 | Jeon | G06Q 30/0269 |
| 2018/0218395 A1* | 8/2018 | Strobl | G06Q 30/0251 |

OTHER PUBLICATIONS

Fang, Jing. "Targeted Advertising Based on Social Network Analysis." Applied Mechanics and Materials, vols. 488-489, Jan. 2014. (Year: 2014).*

United States Office Action, U.S. Appl. No. 15/243,693, dated Sep. 27, 2019, 21 pages.

United States Office Action, U.S. Appl. No. 15/243,693, dated Jul. 30, 2019, 24 pages.

"Non Final Office Action, U.S. Appl. No. 15/243,693", dated Sep. 2, 2020, 26 pages.

* cited by examiner

INFORMATIVE ADVERTISEMENTS ON HOBBY AND STRONG INTERESTS FEATURE SPACE

BACKGROUND

This disclosure relates generally to delivery of advertisements to users, and more specifically to selection of informative advertisements based on users' hobby and strong interest feature space.

Online services, such as social networking systems, search engines, news aggregators, Internet shopping services, and content delivery services, have become a popular venue for presenting advertisements to prospective buyers. The online services may generate revenue by presenting advertisements to users, who may take certain actions based on the presented advertisements (e.g., clicking of the advertisements). The advertisement-based online service model has spawned many diverse types of online services.

An online system, such as a social networking system, allows its users to connect to and communicate with other online system users. Users may create profiles on an online system that are tied to their identities and include information about the users, such as interests and demographic information. The users may be individuals or entities such as corporations or charities. Because of the increasing popularity of online systems and the increasing amount of user-specific information maintained by online systems, an online system provides an ideal forum for entities to increase awareness about products or services by presenting content items to online system users.

Presenting content items to online system users allows an entity to gain public attention for products or services or to persuade online users to take an action regarding the entity's products or services. Additionally, many online systems generate revenue by displaying certain content items to their users. Frequently, online systems charge entities for each presentation of certain types of content items to an online system user (e.g., each "impression" of the certain types of content items) or for each interaction with certain types of content items by an online system user. The display of an advertisement to a viewer of the advertisement is referred to herein as an advertising "impression."

Some online services adopt a bidding system that allows multiple advertisers to bid for advertisement space. When an advertisement is required for a particular advertisement space, the advertisement with the highest bidding price is selected and presented in the advertisement space to maximize the advertisement fees. The bidding system may also employ a cap for limiting the amount of advertisement fees for a set period of time (e.g., day or month). The context of an advertisement may affect the value of the advertisement to an advertiser, and accordingly, may affect the amount the advertiser is willing to bid for the advertisement.

During an advertising campaign, it is desirable to select a set of advertisements for presentation to online system users that would provide informative and personalized contexts to the online system users. This would increase a probability that the online system users will take actions based on the presented personalized and informative advertisements, such as clicking of the advertisements and purchasing product items related to the advertisements.

SUMMARY

An online system, such as a social networking system, receives information describing an advertising campaign that includes one or more advertisements from an advertiser for presentation to one or more users of the online system. The advertiser may further specify an interest feature domain within the advertising campaign. A hobby and strong interest feature space (domain) can be generated for each of the one or more users of the online system by inferring users' strong interests based on actions indicative of strong interests and using techniques based upon a machine learning model. A set of related items is further obtained, wherein each item in the set is related to an action that may be conducted by the one or more online system users, such as purchasing of an advertised item or viewing/attending an advertised event.

An advertisement from the advertising campaign is selected for presentation to a viewing online system user, wherein the advertisement matches the user's inferred strong interests. The advertisement is selected for presentation to the viewing user based on whether the advertisement is related to an item that completes the set of related items, whether the user interacted in the past with at least one item in the set of related items, and whether the advertisement selected for presentation to the viewing user is within the hobby and strong interest feature domain of the viewing user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
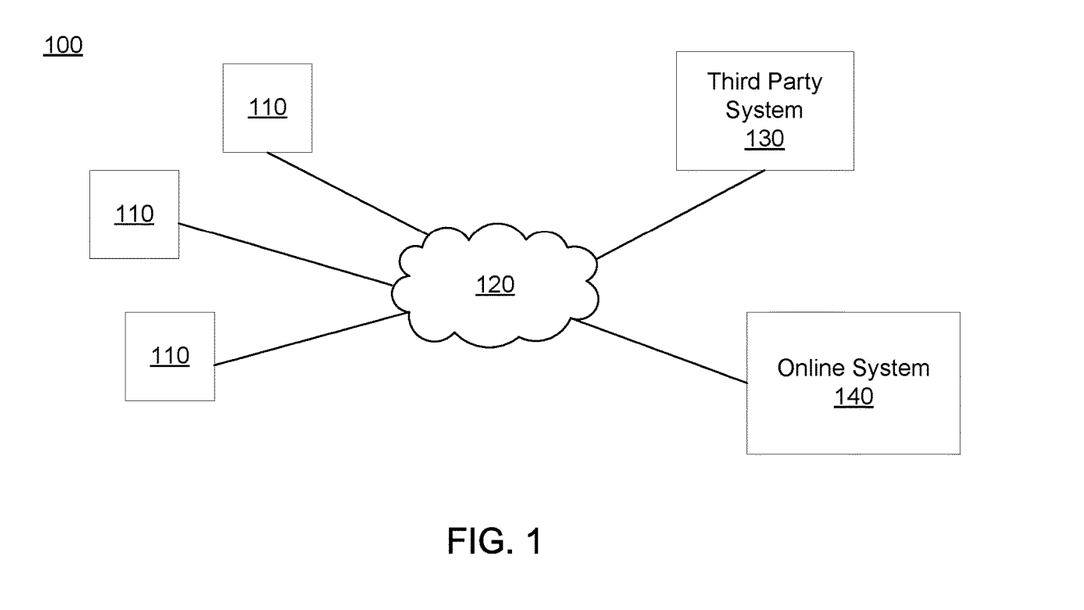
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein may be adapted to online systems that are social networking systems, content sharing networks, or other systems providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

In some embodiments, one or more of the third party systems 130 provide content to the online system 140 for presentation to users of the online system 140 and provide compensation to the online system 140 in exchange for presenting the content. For example, a third party system 130 provides advertisement requests, which are further described below in conjunction with FIG. 2, including advertisements for presentation and amounts of compensation provided by the third party system 130 to the online system 140 in exchange for presenting the advertisements to the online system 140. Content presented by the online system 140 for which the online system 140 receives compensation in exchange for presenting is referred to herein as "sponsored content," "sponsored content items," or "advertisements." Sponsored content from a third party system 130 may be associated with the third party system 130 or with another entity on whose behalf the third party system 130 operates.

Figure 2:
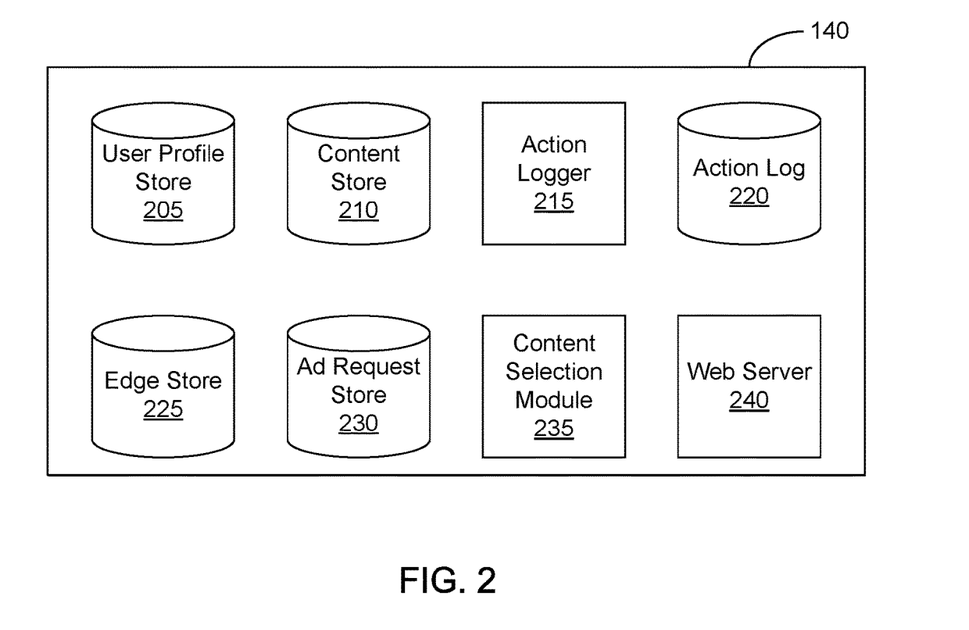
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an advertisement ("ad") request store 230, a content selection module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged and stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity. In some embodiments, the brand page associated with the entity's user profile may retrieve information from one or more user profiles associated with users who have interacted with the brand page or with other content associated with the entity, allowing the brand page to include information personalized to a user when presented to the user.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), engaging in a transaction, viewing an object (e.g., a content item), and sharing an object (e.g., a content item) with another user. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or a particular user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. In various embodiments, the ad request store 230 includes one or more ad requests, each ad request representing a request from an advertiser to serve an advertisement to one or more users of the online system 140 during an advertising campaign ("ad campaign"). An ad campaign includes one or more advertisements for presentation to one or more users of the online system 140. The ad campaign may be associated with one or more objectives, a budget and duration. An objective associated with an ad campaign describes one or more goals for presentation of advertisements during the ad campaign. For example, an objective specifies a total number of impressions of advertisements to be delivered to the users of the online system 140 under the ad campaign during a time interval of the ad campaign. The budget specifies a total amount of compensation a user (e.g., an advertiser) associated with an ad campaign provides the online system 140 for presenting advertisements to the users of the online system 140.

Additionally, the duration associated with the ad campaign specifies a time interval during which advertisements are presented to social networking system users. For example, if the duration of an ad campaign is 30 days, advertisements included in the ad campaign are presented to online system users for 30 days after the ad campaign is provided to the online system 140. In some embodiments, the user providing the ad campaign may also specify a start date for the ad campaign, so the duration is measured from the specified start date.

An ad campaign includes one or more advertisements for presentation to one or more social networking system users. An advertisement includes advertisement content and a bid amount. The advertisement is text, image, audio, video, or any other suitable data presented to a user. The advertisement may also include a landing page specifying a network address to which a user is directed when the advertisement content is accessed. In some embodiments, the bid amount is associated with an advertisement by a user providing the advertisement to the online system 140 and is used to determine an expected value, such as monetary compensation, provided by the user to the online system 140 if the advertisement is presented to another user, if the advertisement receives an interaction from another user presented with the advertisement, or if any suitable condition is satisfied when the advertisement is presented to another user. For example, the bid amount specifies a monetary amount that the online system 140 receives from an advertiser if an advertisement is displayed. In some embodiments, the expected value to the online system 140 of presenting the advertisement may be determined by multiplying the bid amount by a probability of the advertisement being accessed by a user.

Alternatively, the user providing an advertisement to the online system 140 does not associate a bid amount with the advertisement, but the online system 140 determines a bid amount for the advertisement based on a budget, a duration, or an objective associated with the ad campaign including the advertisement. For example, a pacing factor is determined from the budget associated with an ad campaign including the advertisement and an amount spent by an advertiser on the ad campaign from a start date of the ad campaign to a current time. The pacing factor modifies a bid amount associated with various advertisements in the ad campaign, altering spending of the ad campaign's budget throughout the duration of the ad campaign.

Additionally, an advertisement may include one or more targeting criteria specified by the user providing the advertisement to the online system 140 (e.g., advertiser). Targeting criteria included in an advertisement specify one or more characteristics of users eligible to be presented with advertisement content in the advertisement. For example, targeting criteria are used to identify users having user profile information, edges, or actions satisfying at least one of the targeting criteria. Hence, targeting criteria allow a user to identify other users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users who have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows further refinement of users eligible to be presented with an advertisement. As another example, targeting criteria identifies users having a connection to another user or object or having a particular type of connection to another user or object.

The content selection module 235 selects one or more content items for communication to a client device 110 to be presented to a user. Content items eligible for presentation to the user are retrieved from the content store 210, from the ad request store 230, or from another source by the content selection module 235, which selects one or more of the content items for presentation to the user. A content item eligible for presentation to the user may be a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the user. For example, the content selection module 235 determines measures of relevance of various content items to the user based on characteristics associated with the user by the online system 140, based on the user's affinity for different content items, and/or based on inferred hobbies and interests of the user. Information associated with the user included in the user profile store 205, in the action log 220, and in the edge store 225 may be used to determine the measures of relevance and to infer the user's hobbies/interests. Based on the measures of relevance and the inferred user's hobbies/interests, the content selection module 235 selects content items for presentation to the user. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items selected for presentation to the user may include advertisements or other content items associated with bid amounts. The content selection module 235 uses the bid amounts associated with advertisements when selecting content for presentation to the viewing user. In various embodiments, the content selection module 235 determines an expected value associated with various advertisements (or other content items) based on their bid amounts and selects advertisements associated with a maximum expected value or associated with at least a threshold expected value for presentation. An expected value associated with an advertisement or with a content item represents an expected amount of compensation to the online system 140 for presenting an advertisement from for presenting the content item. For example, the expected value associated with an advertisement is a product of the advertisement's bid amount and a likelihood of the user interacting with the advertisement content. The content selection module 235 may rank advertisements based on their associated bid amounts and select advertisements having at least a threshold position in the ranking for presentation to the user. In some embodiments, the content selection module 235 ranks both content items not associated with bid amounts and advertisements in a unified ranking based on bid amounts associated with advertisements and measures of relevance associated with content items and with advertisements. Based on the unified ranking, the content selection module 235 selects content for presentation to the user. Selecting advertisements and other content items through a unified ranking is further described in U.S. patent application Ser. No. 13/545,266, filed on Jul. 10, 2012, which is hereby incorporated by reference in its entirety.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Selection of Informative Advertisements Based on Hobby/Interests Feature Space

Disclosed embodiments include methods for selection of relevant, informative and useful advertisements for delivery to online system users based on inferred strong interests or hobbies of the online system users. In various embodiments, the methods for selection of advertisements may be performed by the content selection module 235 of the online system 140. The online system 140 may correspond to an advertising system providing advertisements for presentation to users during an advertising campaign ("ad campaign"). In some embodiments, the content selection module 235 may be configured to infer users' hobbies and/or strong interests using a variety of methods discussed in more details below, such as utilization of actions indicative of strong interests (e.g., purchases performed by the online system users), and applying techniques based on machine learning. The online system 140 delivers to the online system users selected advertisements that match the users' inferred hobbies and/or strong interests. In some embodiments, the content selection module 235 may determine whether a specific advertisement to be selected for presentation to an online system user completes a particular set of items, such as a set of complimentary items for purchase or a set of related digital media items for viewing/attending. If the advertisement completes the set of related items and is within a domain of user's inferred hobbies and/or strong interests, the content selection module 235 selects the advertisement and delivers the advertisement for presentation to the online system user.

Described embodiments include methods for providing advertisements to online system users based on personalized hobbies or strong interests. The methods presented herein can be applied by the content selection module 235 for construction of a hobby/strong interest feature space (domain) for each online system user. In some embodiments, the hobby/strong interest feature domain can be derived based on certain actions performed by an online system user and/or by collecting various user-related data. In one or more embodiments, the hobby/strong interest feature domain can be derived based on advertisement conversion data, attribution data related to user's purchases or other strong actions in response to one or more advertisements, data related to user's interaction with one or more advertisements such as clicking on advertisement presentations, a set of interests being input by the user upon signing to a certain publishing domain, user's posts on the publishing domain, and the like.

Figure 3:
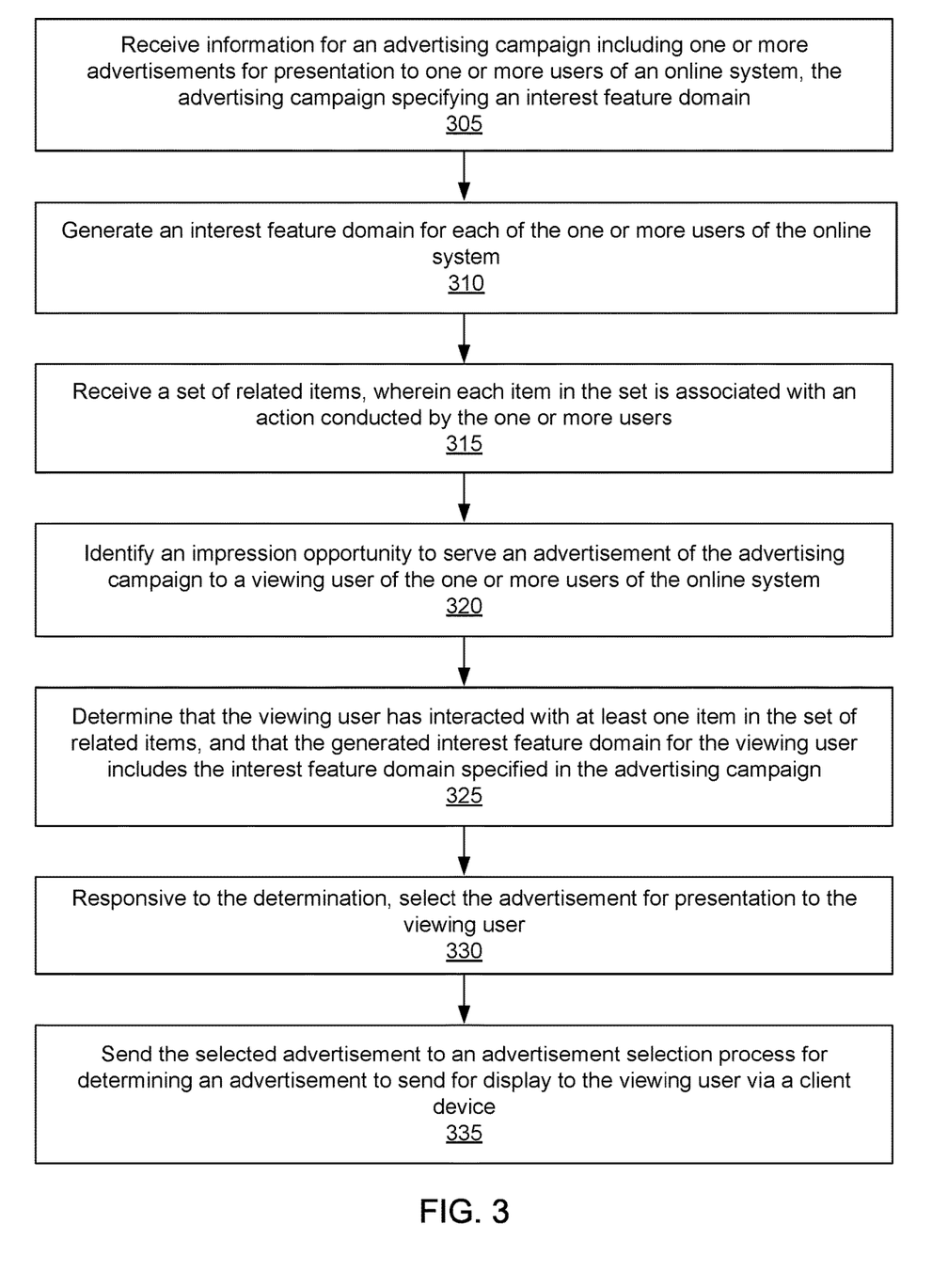
FIG. 3 is a flowchart of a method for selection of informative advertisements based on a hobby and strong interests feature space, in accordance with an embodiment.

FIG. 3 is a flowchart of one embodiment of a method for selection of informative advertisements based on hobby and strong interests feature domain, in accordance with an embodiment. In various embodiments, the steps described in conjunction with FIG. 3 may be performed in different orders than the order described in conjunction with FIG. 3. Additionally, the method may include different and/or additional steps than those described in conjunction with FIG. 3 in some embodiments.

The online system 140 receives 305 information for an ad campaign including one or more advertisements for presentation to one or more users of the online system 140. In some embodiments, an advertiser may provide the information for the ad campaign including the one or more advertisements to the online system 140. The information may specify a budget for the ad campaign and an objective for the ad campaign that specifies one or more goals for presentation of advertisements from the ad campaign to online system users. Additionally, the information for the ad campaign includes bid amounts associated with one or more advertisements in the ad campaign or instructions for determining bid amounts for advertisements in the ad campaign. For example, the information includes instructions for allocating the budget among advertisements in the ad campaign based on one or more criteria (e.g., an amount of the budget remaining, an amount of the objective that has been completed, an amount of a time interval of the ad campaign remaining, and so on). In some embodiments, the advertiser specifies a hobby/strong interest feature domain within the provided information for the ad campaign.

A feature domain of strong interest is generated 310 for each of the one or more users of the online system 140. In some embodiments, the feature domain of strong interest is generated 310 by inferring one or more strong interests of each of the one or more users based on various actions performed by each of the one or more users. For example, the actions performed by the one more users comprise at least one of: purchasing one or more items associated with the set of related items, or viewing or attending one or more events associated with the set of related items. Information about the users' actions can be stored in the action log 220 of the online system 140. In some embodiments, the information about the users' actions can be provided from the action log 220 to the content selection module 235 or to some other module of the online system 140 that generates 310 the feature domain of strong interest.

In various embodiments, the feature domain of strong interest is generated 310 further based on a machine learning model, which is discussed in more detail below. Training of the machine learning model can be based on attribution data associated with each online system user, such as purchasing of an item, interaction with an advertisement, dwelling on an advertisement for some period of time, attending/viewing an advertised event, and the like, which may be available at the user profile store 205 and/or the action log 220 of the online system 140.

In some embodiments, user's hobbies/strong interests can generally be inferred and the feature domain of strong interest can be generated 310 based on certain strong action(s) performed by the user in the past available in the action log 220, such as an actual purchase of an item, attending or viewing a sporting or movie event through purchasing a ticket using an advertisement, and the like. In general, a user's strong action performed in the past can be related to an activity on which the user spent certain amount of time and/or financial resources. The information about user's activity in relation to the strong actions performed in the past can be available in the action log 220. In one or more embodiments, the online system 140 can limit a number of hobbies or strong interests for each user, i.e., a maximum number of hobbies or strong interests can be pre-determined and smaller than a defined threshold (e.g., equal to three). In this way, a hobby/strong interest feature space constructed for each online system user is limited and includes more personalized hobbies and strong interests. The limited hobby/strong interest feature space for each user facilitates selection of more informative advertisements by the content selection module 235 for delivery and presentation to an online system user, which would result into higher probabilities for user's actions to be conducted in response to the presentation of the informative advertisements.

In some embodiments, the content selection module 235 may represent a user's personal assistant when delivering a certain informative advertisement to a user. The informative advertisement can be, for example, related to a certain event that can be viewed via media or personally attended, or to a certain item that can be purchased by the user. Specific information about an event or a purchasing item can be selected by the content selection module 235 and delivered as an informative advertisement to a user based on previously inferred user's strong interests and the feature domain of strong interest generated 310. Since the advertisement is selected and presented to the user based on the previously inferred user's strong interests, this particular informative advertisement can be rather viewed, not only as an ordinary advertisement, but a personal help for the user to perform a certain action in a preferred manner. For example, the user would anyway purchase a desired item, but based on the selected informative advertisement delivered to the user, the user would purchase the desired item with a certain discount advertised in the selected informative advertisement.

In some embodiments, a machine learning model can be applied by the online system 140 to infer hobbies and/or strong interests of each online system user, i.e., to generate 310 the feature domain of strong interest for each user. The machine learning model can be generated and integrated into the content selection module 235 of the online system 140 for selection of one or more content items (e.g., informative advertisements) for communication to a client device 110 to be presented to a user. An input into the machine learning model can be based on at least one of advertisement conversion data, advertisement interaction data, or attribution data (e.g., information related to purchasing actions) associated with the user, which may be available at the action log 220 and/or the user profile store 205 of the online system 140. An output of the machine learning model comprises a defined set of hobbies and/or strong interests of the user, i.e., the machine learning model generates 310 the feature domain of strong interest based on the provided input. In some embodiments, training of the machine learning model can be based on, for example, attribution data, action(s) associated with a certain device identifier (ID) that may indicate a strong action performed by a person using the same client device 110 as a targeted user, advertisement interaction data, information about dwelling on a particular advertisement for a defined time period, information about attending or viewing a certain sporting or movie event, and the like. Data employed for training of the machine learning model may be available at the action log 220 and/or the user profile store 205 of the online system 140.

Thus, the feature domain of user's strong interest can be generated 310 based on the trained machine learning model integrated into the content selection module 235. One or more advertisements selected by the content selection module 235 based on the machine learning model and delivered for presentation to a user matches one or more inferred strong interests of the user, i.e., matches the strong interest feature domain generated 310 for the user.

In an illustrative embodiment, the content selection module 235 can obtain information from the action log 220 about a user attending or viewing a certain sporting, movie or other entertainment event in the near past through purchasing a ticket using an advertisement. This information indicates to the content selection module 235 that the user has strong interest for attending or viewing in the future some other sporting, movie or other entertainment event related in a certain way with the event attended/viewed in the near past, such as a sporting event related to same sporting team, a movie sequel, TV show, and the like. In another illustrative embodiment, the content selection module 235 can obtain information from the action log 220 about a user purchasing a certain item online using a corresponding advertisement presented to the user. This information indicates to the content selection module 235 that the user has strong interest in purchasing one or more other items related in a certain way to the purchased item. For example, the purchased item and the one or more other items can be complementary items that complete a set of related items. Based on the collected information about attending/viewing certain events and/or purchasing certain items in the past, the content selection module 235 can generate 310 the feature domain of user's strong interest.

In some embodiments, the content selection module 235 utilizes information about a threshold number of actions (e.g., obtained from the action log 220) performed by a user to infer user's strong interest and generate 310 the feature domain of user's strong interest. The content selection module 235 further selects one or more advertisements for delivery and presentation to the user based on the generated feature domain of user's strong interest. For example, the strong interest can be inferred and the feature domain of user's strong interest can be generated 310 once the user performs a certain pre-determined number of actions. The information utilized for inferring a user's strong interest and generating 310 the feature domain of strong interest can be also related to information (e.g., obtained from the action log 220) on how frequently a user performs a certain action compared to a rest of population. For example, a strong interest can be inferred and the feature domain of user's strong interest can be generated 310 once a number of actions performed by the user is greater than an average number of actions for a certain amount of population.

In some embodiments, an informative advertisement selected by the content selection module 235 based on the feature domain of strong interest generated 310 can go through an auction before being delivered and presented to a user. Since the advertisement is selected based on the inferred strong interest of the user, the online system 140 can propose a larger bid amount for this particular advertisement than for some other advertisements not being selected based the user's strong interest feature domain. The inferred user's strong interest represents a higher level of information related to the user, and can be stored into the user profile store 205. A bid amount for the informative advertisement selected based the user's strong interest feature domain generated 310 can be higher as the advertiser has more interest to present the advertisement to the user as the advertiser targets a specific user with a strong interest related to the advertisement. In some embodiments, an advertiser can buy certain hobbies and/or strong interests. Then, any online system user with a certain hobby or strong interest becomes a targeting audience for advertisements delivered by the advertiser. In this way, users can be classified in buckets of hobbies/strong interests. Information about each user belonging to a certain bucket of hobbies/strong interests can be stored into the user profile store 205 of the online system 140.

A set of related items is received 315 (e.g., from an advertiser) for each online system user and may be provided to the content selection module 235 of the online system 140. Each item in the set of related items is associated with an action that may be conducted by the online system user, either in the past or in the future. In some embodiments, the set of related items may be obtained and received 315 based on the feature domain of strong interest that is previously generated 310 for each online system user. The set of related items comprises at least one of: a plurality of complementary items, a plurality of related digital media items, or a plurality of related events. For example, the complementary items may be related to certain items for purchasing that complement each other or form a complete set of items. The related digital media items and events may be sequential media events, such as movie sequels, sporting events, TV shows, novels, etc.

In some embodiments, as discussed, the content selection module 235 selects an advertisement for delivery and presentation to an online system user that matches the feature domain of user's strong interest generated 310. In addition, the content selection module 235 selects the advertisement for presentation to the user based also on completion of a defined set of actions performed by the user or based on complementing previous action(s), i.e., the advertisement is selected if relates to an item of the set of related items received 315 and available at the content selection module 235. In an illustrative embodiment, the item related to the selected advertisement may be an item that completes the set of related items received 315, such as a purchasing item, a sporting event, a movie sequel, an episode of TV series, a sequel of novels, and the like.

The online system 140 identifies 320 an impression opportunity to serve an advertisement of the ad campaign to a viewing user of the one or more users of the online system. In some embodiments, an impression opportunity represents an opportunity when the online system 140 is able to serve an advertisement to an online system user. In an embodiment, an impression opportunity can be a pull opportunity, such as a page refresh, a use of a mobile application, etc. In another embodiment, an impression opportunity can be a push opportunity, such as a notification about an advertisement.

The online system 140 determines 325 that the viewing user has interacted with at least one item in the set of related items, and that the generated interest feature domain for the viewing user includes the interest feature domain specified in the ad campaign.

Responsive to the determining 325, the online system 140 selects 330 (e.g., via the content selection module 235) the advertisement for presentation to the viewing user. In some embodiment, the advertisement is selected 330 if the advertisement specifies one or more items in the set of related items received 315, the viewing user interacted in the past with at least one item in the set of related items, and the advertisement is within the feature domain of user's strong interest generated 310. In some embodiments, the advertisement is selected 330 for presentation to the viewing user based on indication about time periods of user's interaction with at least one item in the set of related items. The indication about time periods of user's interaction with item(s) in the set of related items can be obtained from the action log 220. In an embodiment, the time periods of user's interaction can be seasonal, i.e., during specific periods in a year. In another embodiment, the time periods of user's interaction can be diurnal, i.e., during specific periods of a day. Interaction of the viewing user with the at least one item in the set of related items can be tracked during the identified time periods based on information in the action log 220. In some embodiments, the advertisement is selected 330 for presentation to the viewing user based on whether the advertisement is related to an item that completes the set of related items received 315, i.e., the advertisement is related to the item that is complementary with the related items in the set.

In various embodiments, the online system 140 utilizes a cyclic graph of related items in the set of related items when tracking user's interactions with the related items in the set. In this case, the viewing user can interact with a certain item only after previously interacting with at least one other item in the set of related items. The cyclic graph therefore forces an order of user's interactions with the related items. In some embodiments, the advertisement is selected 330 for presentation to the viewing user upon obtaining (e.g., from the action log 220) indication about an order of interaction of the viewing user with the at least one item in the set of related items based on a cyclic graph of the related items. The advertisement is selected 330 for presentation to the viewing user based on the order of the interaction of the viewing user with the at least one item in the set of related items.

The online system 140 sends 335 the selected advertisement to an advertisement selection process for determining an advertisement to send for display to the viewing user via a client device (e.g., client device 110). In some embodiments, the advertisement selection process selects an advertisement based on bids provided thereto. In an embodiment, the content selection module 235 of the online system 140 performs the advertisement selection process. The content selection module 235 selects through the advertisement selection process content for presentation to the viewing user of the online system 140, such as an advertisement for presentation to the viewing users via the identified impression opportunity. For example, the advertisement selection process is an auction based on the determined bid amount for the ad campaign and other bid amounts of advertisements from other ad campaigns. In some embodiments, the advertisement selection process ranks the advertisement from the ad campaign and advertisements from other ad campaigns based on the determined bid amount and the other bid amounts, respectively. In some embodiments, advertisements having at least a threshold position in the ranking or at least a threshold bid amount are sent for display to one or more users of the online system 140.

Machine Learning Model for Generation of Hobby/Strong Interest Feature Space

Figure 4:
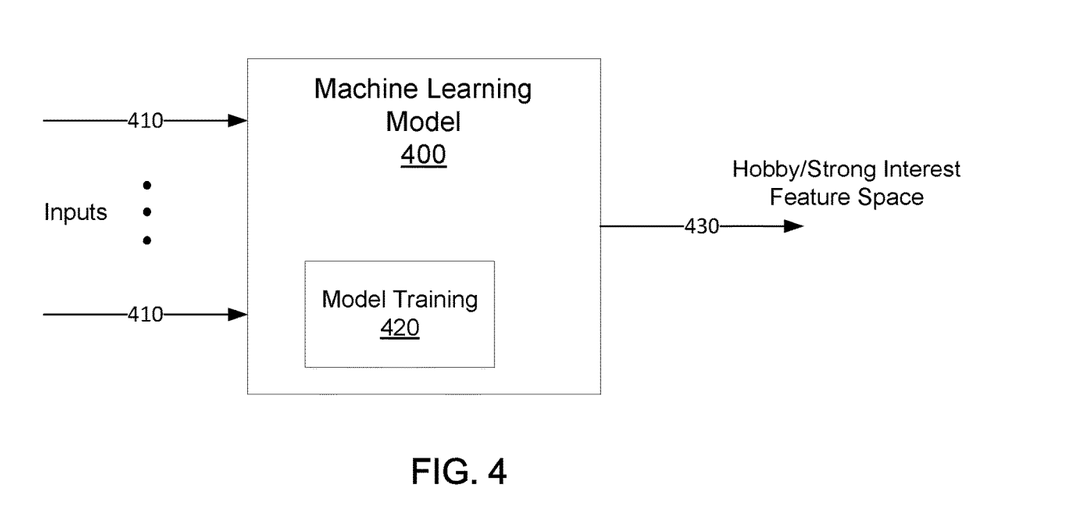
FIG. 4 illustrates a process flow diagram of building a machine learning model for constructing a hobby and strong interest feature space, in accordance with an embodiment.

FIG. 4 illustrates a process flow diagram of building a machine learning model 400 for constructing a hobby and strong interest feature space, in accordance with an embodiment. In various embodiments, as discussed, the feature domain of users' strong interest is generated 310 based at least in part on the machine learning model 400 of the online system 140. In one or more embodiments, inputs 410 into the machine learning model 400 may comprise conversion data associated with one or more online system users, interaction data of the one or more users, attribution data of the one or more users, and the like.

Training 420 of the machine learning model 400 can be based on data related to interaction of the one or more users with certain delivered advertisements (e.g., clicking on presentations of the delivered advertisements), various attribution data related to the one or more online system users (e.g., data related to purchasing an item, data related to a strong intent to purchase an item, data related to viewing or attending an event, data related to a strong intent to view or attend an event), data related to dwelling on a particular advertisement a time period longer than a defined threshold, information about action(s) performed by an online system user on a client device that may indicate a strong interest of another online system user related to the online system user that access advertisements through the same client device.

An output 430 of the machine learning model 400 represents a set of hobbies and strong interests related to the one or more online system users, i.e., the output 430 comprises a hobby and strong interest feature space (domain). In some embodiments, the machine learning model 400 may be integrated into the content selection module 235 of the online system 140. The content selection module 235 selects an advertisement for presentation to the one or more online system users, if the advertisement is related to at least one item in a set of related items, the one or more online system users have been interacted in the past with one or more items in the set of related items, and the advertisement is within the hobby and strong interest feature space 430 obtained by applying the machine learning model 400.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

receiving information for an advertising campaign ("ad campaign") including one or more advertisements for presentation to one or more users of an online system, wherein each advertisement of the ad campaign comprises one or more related content items in a set of content items and a graph describing an order for a viewing user of the online system to interact with related content items of the set;

training a machine learning model based on data related to actions performed by the one or more users on a device having an identifier matching with an identifier of a client device used by the viewing user;

inputting, into the trained machine learning model, information about each relative frequency with which the viewing user performs one or more actions associated with each of a plurality of hobbies compared to other users of the online system;

generating, by the trained machine learning model, a set of values for the hobbies for the viewing user based on the information about each relative frequency, each value being a measure of the viewing user's interest for a different hobby of the plurality of hobbies;

determining a subset of the hobbies, based on the set of values for the hobbies;

determining that a subset of advertisements included in the ad campaign is associated with at least one hobby in the subset of hobbies, each advertisement of the subset classified as having a threshold probability of the viewing user interacting with the advertisement;

determining, based on a history of interactions performed by the viewing user with content items, an order that the viewing user interacted with a first content item and a second content item of the set;

comparing the determined order with one or more orders of interactions described by one or more graphs for sets of related content items comprising the first content item and the second content item;
responsive to matching the determined order with the one or more orders based on the comparison, identifying an advertisement of the ad campaign corresponding to the matching graph;
selecting the identified advertisement for presentation to the viewing user; and
sending the selected advertisement for display to the viewing user via the client device.

2. The method of claim 1, wherein generating the set of values for the hobbies for the viewing user further comprises:
inferring one or more strong interests of the viewing user based on actions performed by the viewing user.

3. The method of claim 2, wherein the actions performed by the viewing user comprises at least one of:
purchasing one or more items associated with a set of related items, each item in the set associated with an action conducted by the viewing user; and
viewing or attending one or more events associated with the set of related items.

4. The method of claim 1, further comprising:
training the machine learning model based on attribution data associated with the viewing user.

5. The method of claim 1, further comprising:
receiving a set of related items, each item in the set associated with an action conducted by the viewing user,
wherein the set of related items comprises at least one of a plurality of complementary items, and a plurality of related digital media items.

6. The method of claim 1, further comprising:
receiving a set of related items, wherein each item in the set is associated with an action conducted by the viewing user;
determining that the viewing user has interacted with at least one item in the set of related items;
receiving indication of time periods of the interaction of the viewing user with the at least one item in the set of related items; and
tracking the interaction of the viewing user with the at least one item in the set of related items during the identified time periods.

7. The method of claim 1, further comprising:
receiving a set of related items, wherein each item in the set is associated with an action conducted by the viewing user; and
selecting the advertisement for presentation to the viewing user based on determining that the advertisement is related to an item that completes the set of related items.

8. The method of claim 1, further comprising:
receiving a set of related items, wherein each item in the set is associated with an action conducted by the viewing user;
receiving indication about an order of interaction of the viewing user with at least one item in the set of related items based on a cyclic graph of the related items; and
selecting the advertisement for presentation to the viewing user based on the order of the interaction of the viewing user with the at least one item in the set of related items.

9. A computer program product comprising a non-transitory computer-readable storage medium having instructions encoded thereon that, when executed by a processor, cause the processor to:

receive information for an advertising campaign ("ad campaign") including one or more advertisements for presentation to one or more users of an online system, wherein each advertisement of the ad campaign comprises one or more related content items in a set of content items and a graph describing an order for a viewing user of the online system to interact with related content items of the set;
train a machine learning model based on data related to actions performed by the one or more users on a device having an identifier matching with an identifier of a client device used by the viewing user;
input, into the trained machine learning model, information about each relative frequency with which the viewing user performs one or more actions associated with each of a plurality of hobbies compared to other users of the online system;
generate, by the trained machine learning model, a set of values for the hobbies for the viewing user based on the information about each relative frequency, each value being a measure of the viewing user's interest for a different hobby of the plurality of hobbies;
determine that a subset of advertisements included in the ad campaign is associated with at least one hobby in the subset of hobbies, each advertisement of the subset classified as having a threshold probability of the viewing user interacting with the advertisement;
compare the determined order with one or more orders of interactions described by one or more graphs for sets of related content items comprising the first content item and the second content item;
responsive to matching the determined order with the one or more orders based on the comparison, identify an advertisement of the ad campaign corresponding to the matching graph;
select the identified advertisement for presentation to the viewing user; and
send the selected advertisement for display to the viewing user via the client device.

10. The computer program product of claim 9, wherein the instructions further cause the processor to:
infer one or more strong interests of the viewing user based on actions performed by the viewing user.

11. The computer program product of claim 10, wherein the actions performed by the viewing user comprises at least one of:
purchasing one or more items associated with a set of related items, each item in the set associated with an action conducted by the viewing user; and
viewing or attending one or more events associated with the set of related items.

12. The computer program product of claim 9, wherein the instructions further cause the processor to:
train the machine learning model based on attribution data associated with the viewing user.

13. The computer program product of claim 9, wherein the instructions further cause the processor to:
receive a set of related items, each item in the set associated with an action conducted by the viewing user, and
wherein the set of related items comprises at least one of a plurality of complementary items, and a plurality of related digital media items.

14. The computer program product of claim 9, wherein the instructions further cause the processor to:

receive a set of related items, each item in the set associated with an action conducted by the viewing user;

determine that the viewing user has interacted with at least one item in the set of related items;

receive indication of time periods of the interaction of the viewing user with the at least one item in the set of related items; and track the interaction of the viewing user with the at least one item in the set of related items during the identified time periods.

15. The computer program product of claim 9, wherein the instructions further cause the processor to:

receive a set of related items, each item in the set associated with an action conducted by the viewing user; and select the advertisement for presentation to the viewing user based on determining that the advertisement is related to an item that completes the set of related items.

16. The computer program product of claim 9, wherein the instructions further cause the processor to:

receive a set of related items, each item in the set associated with an action conducted by the viewing user;

receive indication about an order of interaction of the viewing user with at least one item in the set of related items based on a cyclic graph of the related items; and select the advertisement for presentation to the viewing user based on the order of the interaction of the viewing user with the at least one item in the set of related items.

\* \* \* \* \*